US008155874B2

(12) United States Patent
Cho et al.

(10) Patent No.: US 8,155,874 B2
(45) Date of Patent: Apr. 10, 2012

(54) APPARATUS FOR INTEGRATED NAVIGATION BASED ON MULTI FILTER FUSION AND METHOD FOR PROVIDING NAVIGATION INFORMATION USING THE SAME

(75) Inventors: Seong-Yun Cho, Daejon (KR); Byung-Doo Kim, Daejon (KR); Young-Su Cho, Seoul (KR); Wan-Sik Choi, Daejon (KR); Jong-Hyun Park, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 436 days.

(21) Appl. No.: 12/513,844

(22) PCT Filed: Mar. 23, 2007

(86) PCT No.: PCT/KR2007/001431
§ 371 (c)(1),
(2), (4) Date: May 6, 2009

(87) PCT Pub. No.: WO2008/056861
PCT Pub. Date: May 15, 2008

(65) Prior Publication Data
US 2010/0049439 A1 Feb. 25, 2010

(30) Foreign Application Priority Data
Nov. 7, 2006 (KR) ........................ 10-2006-0109555

(51) Int. Cl.
*G01C 21/00* (2006.01)
(52) U.S. Cl. ........................ 701/213; 701/216; 701/220

(58) Field of Classification Search .................. 701/200, 701/207, 213, 214, 216, 220; 342/357.2
See application file for complete search history.

(56) References Cited

U.S. PATENT DOCUMENTS

| | | | |
|---|---|---|---|
| 5,543,804 A | 8/1996 | Buchler et al. | |
| 6,246,960 B1 | 6/2001 | Lin | |
| 6,278,945 B1* | 8/2001 | Lin | 701/216 |
| 6,408,245 B1 | 6/2002 | An et al. | |
| 6,449,559 B2* | 9/2002 | Lin | 701/216 |
| 6,671,622 B2* | 12/2003 | McCall et al. | 701/220 |
| 2001/0020216 A1 | 9/2001 | Lin | |
| 2002/0019701 A1 | 2/2002 | Miller | |
| 2002/0021245 A1 | 2/2002 | Lin et al. | |

(Continued)

FOREIGN PATENT DOCUMENTS

EP 0504024 A1 9/1992

(Continued)

OTHER PUBLICATIONS

S.Y. Cho et al., "Enhanced MEMS-INS/GPS Integrated System", ION GNSS 2006, Sep. 26-29, 2006.

(Continued)

*Primary Examiner* — Isam Alsomiri
(74) *Attorney, Agent, or Firm* — Rabin & Berdo, P.C.

(57) ABSTRACT

Provided are an integrated navigation apparatus and a method for providing navigation information using the same. The integrated navigation apparatus includes a first filter, a second filter, a mode probability updating unit, a first navigation information calculating unit, a second navigation information calculating unit, a fusion unit and a navigation information fusion unit.

20 Claims, 6 Drawing Sheets

U.S. PATENT DOCUMENTS

2002/0120400 A1    8/2002  Lin
2005/0114023 A1*   5/2005  Williamson et al. .......... 701/214

FOREIGN PATENT DOCUMENTS

| EP | 1102397 A2 | 5/2001 |
| KR | 19967006084 | 11/1996 |
| KR | 10-0260896 B1 | 4/2000 |
| KR | 20050066544 | 6/2005 |

OTHER PUBLICATIONS

S.Y. Cho et al, "Multi-Filter Fusion Technique for INS/GPS", The Korean Society for Aeronautical and Space Sciences, vol. 34, No. 10, Oct. 2006.

* cited by examiner

APPARATUS FOR INTEGRATED NAVIGATION BASED ON MULTI FILTER FUSION AND METHOD FOR PROVIDING NAVIGATION INFORMATION USING THE SAME

TECHNICAL FIELD

The present invention relates to an integrated navigation apparatus using an Inertial Navigation System (INS) and a Global Positioning System (GPS) and a method for providing navigation information using the same; and, more particularly, to an integrated navigation apparatus that provides robustness location information based on a filter fusion technology for having characteristics robust to various error environments set up in vehicles requiring seamless precise location information and a method for providing navigation information using the same.

BACKGROUND ART

As a Global Positioning System (GPS) technology advances, and GPS receivers are used as location sensors in commercial vehicle navigation systems. Also, a location-based service (LBS) such as a road guidance service and a location-based information providing service is provided based on location information of the vehicle obtained by the GPS receiver. Moreover, a location-based control by using the GPS is performed in a military vehicle and guided arms. However, since the GPS receiver cannot completely or partially receive GPS satellite signals in a tunnel, an underground parking lot, a downtown area and a mountain area, location information cannot be continuously provided to the user.

Therefore, in order to provide the continuous location information regardless of the places, an Inertial Navigation System (INS)/GPS integrated navigation system integrating a GPS receiver with the INS employing an inertial sensor, e.g., an accelerometer and a gyroscope, is proposed. The INS/GPS integrated navigation system is generally used in military systems, but there is a limitation in using it for general commercial purposes because it is an expensive navigation system. To resolve this problem, researchers are studying to develop an inexpensive INS/GPS integrated navigation system.

The INS/GPS integrated navigation system can be designed in various forms based on the type of the INS and the kind of an integration filter. A Kalman filter is used as the integration filter. Since the INS has a nonlinear function, an extended Kalman filter (EKF) is mainly used.

The EKF can estimate an error precisely when an initial error and disturbing noise are small and there is no uncertainty in a model. Since the above conditions cannot be always satisfied in the INS/GPS, there is a shortcoming that error does not converge.

In order to complement the shortcoming of the EKF, researchers are studying various filters such as a sigma point Kalman filter (SPKF), a receding horizon Kalman finite impulse response (RHKF) filter, and an interacting multiple model (IMM). However, an infinite impulse response (IIR) type filter and a finite impulse response (FIR) type filter have mutually complementing characteristics. Thus, when one of the filters is used, the advantage of the other filter cannot be taken. Therefore, a navigation system employing the EKF having IIR characteristics, which is not robust in various error environments, has a problem that errors may occur whenever a error environment is given.

DISCLOSURE

Technical Problem

It is, therefore, an object of the present invention to provide an integrated navigation apparatus that is set up in vehicles requiring seamless and precise location information and can provide robust location information based on a filter fusion technology for integrating filters in such a manner that the integrated navigation apparatus becomes robust to various error environments, and a navigation information providing method using the integrated navigation apparatus.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

Technical Solution

In accordance with one aspect of the present invention, there is provided an integrated navigation apparatus provided with a GPS receiver receiving GPS satellites signals and an inertial measurement unit (IMU) having a 3-axis accelerometer calculating a motion distance of a moving object and a 3-axis gyro measuring a rotation of the moving object, including: a filtering unit for outputting a first state variable estimation value and a second state variable estimation value for error compensation of an INS navigation information based on measurement data inputted from the GPS receiver and error covariances of a first filter and a second filter, calculating and outputting a mode probability for fusing navigation information, performing fusing onto the first filter and the second filter by calculating a fusion probability based on the mode probability and a Markov transition matrix, and outputting fused state variables as fusion results of first navigation information and second navigation information; and an inertial navigation calculating unit for calculating first INS navigation information and second INS navigation information based on measurement data of the IMU, transmitting the first INS navigation information and the second INS navigation information to the filtering unit, compensating the first INS navigation information and the second INS navigation information based on the first state variable estimation value and the second state variable estimation value inputted from the filtering unit, transmitting the compensated first INS navigation information and the compensated second INS navigation information to the filtering unit, compensating the first navigation information and the second navigation information based on the fused state variables inputted from the filtering unit in response to a compensated results of the first INS navigation information and the second INS navigation information, fusing the compensated first navigation information and the compensated second navigation information based on the mode probability inputted from the filtering unit to thereby produce fused navigation information, and providing the fused navigation information to a display unit.

In accordance with another aspect of the present invention, there is provided an integrated navigation apparatus provided with a GPS receiver receiving GPS satellites signals and an IMU having a 3-axis accelerometer calculating a motion distance of a moving object and a 3-axis gyro measuring a rotation of the moving object, including: a first filter and a second filter for providing state variable estimation values in order to compensate navigation information for an error based on measurement data inputted from the GPS receiver and an error covariance and outputting a residual of filter and a residual covariance for updating a mode probability; a mode probability updating unit for calculating a likelihood ratio based on the residual of filter and the residual covariance, updating the mode probability based on the acquired likelihood ratio, outputting the updated mode probability, and calculating and acquiring a fusion probability based on the updated mode probability and a Markov transition matrix; a first navigation information calculating unit and a second navigation information calculating unit for generating INS navigation information based on information inputted from the IMU, transmitting the INS navigation information to the first filter and the second filter, respectively, compensating the INS navigation information based on the state variable estimation values inputted from the first filter and the second filter, compensating the navigation information based on a fused state variable, and outputting the compensated navigation information; a fusion unit for fusing the compensated navigation information inputted from the first navigation information calculating unit and the second navigation information calculating unit based on the fusion probability inputted from the mode probability updating unit, providing the fused state variable to the first navigation information calculating unit and the second navigation information calculating unit, fusing the error covariances inputted from the first filter and the second filter based on the fusion probability, and providing the fused error covariance matrix to the first filter and the second filter; and a navigation information fusion unit for fusing the navigation information inputted from the first navigation information calculating unit and the second navigation information calculating unit based on the mode probability inputted from the mode probability updating unit and outputting fused navigation information.

In accordance with another aspect of the present invention, there is provided a method for providing navigation information in an integrated navigation apparatus having an inertial measurement unit (IMU) and a GPS receiver, including the steps of: a) calculating a first state variable estimation value and a second state variable estimation value for compensating navigation information for an error based on a measurement data inputted from the GPS receiver and an error covariance; b) calculating a likelihood ratio based on residual of filter and a residual covariance, updating a mode probability based on the acquired likelihood ratio, calculating and acquiring a fusion probability based on the updated mode probability and a Markov transition matrix; c) compensating a first INS navigation information and a second INS navigation information based on the first state variable estimation value and the second state variable estimation value acquired in step a); d) fusing the compensated first INS navigation information and the compensated second INS navigation information compensated in step c) based on the fusion probability acquired in step b), acquiring a fused state variable, fusing the error covariance of the filter based on the fusion probability, and outputting a fused error covariance matrix for updating the error covariance of the filter; e) compensating a first navigation information and a second navigation information based on the fused state variable acquired in step d) and outputting a compensated first navigation information and a compensated second navigation information; and f) fusing the compensated first navigation information and the compensated second navigation information based on the updated mode probability updated in step b).

ADVANTAGEOUS EFFECTS

The present invention can provide a user with robust location information by overcoming technical and structure limitations of an expended Kalman filter (EKF) that errors increases and diverges when a modeling error exists and technical and structure limitations of a receding horizon Kalman finite impulse response (RHKF) filter, which is an alternative filters to the EKF, that errors increases when no modeling error exist.

Also, the apparatus of the present invention can be used as a filter for providing navigation information such as location, velocity and posture in navigation apparatuses for aviation and voyage as well as vehicle, and it can be used by changing a state variable of the filter not only in an INS/GPS integrated navigation apparatus but also in various sensor fusion apparatuses.

BEST MODE FOR THE INVENTION

Other objects and aspects of the invention will become apparent from the following description of the embodiments with reference to the accompanying drawings, which is set forth hereinafter. Also, when it is considered that detailed description on a related may obscure a point of the present invention, the description will not be provided. Hereinafter, specific embodiments of the present invention will be described in detail with reference to the accompanying drawings.

Figure 1:
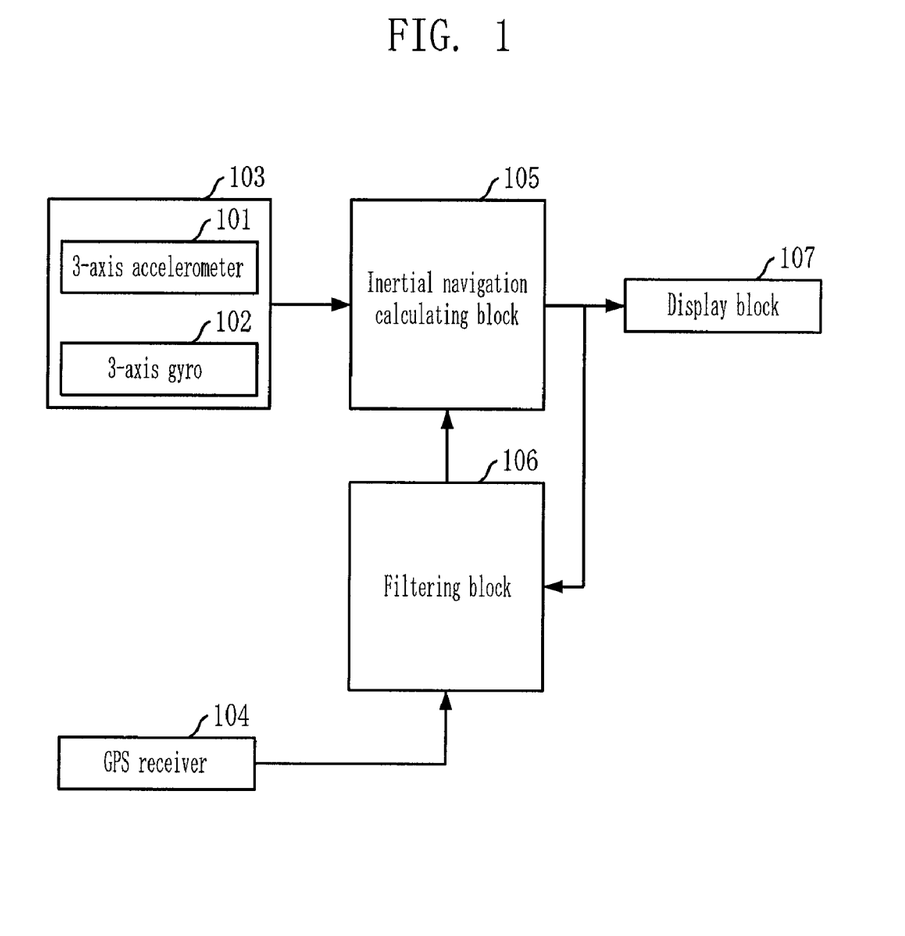
FIG. 1 is a block diagram illustrating an integrated navigation apparatus in accordance with an embodiment of the present invention.

FIG. 1 is a block diagram illustrating an integrated navigation apparatus in accordance with an embodiment of the present invention.

As shown in FIG. 1, the integrated navigation apparatus includes an inertial measurement unit (IMU) 103, a GPS receiver 104, a filtering block 106, an inertial navigation calculating block 105 and a display block 107.

The IMU 103 includes a 3-axis accelerometer 101 for calculating a motion distance of a moving object and a 3-axis gyro 102 for measuring the rotation extent of the moving object. The GPS receiver 104 receives GPS satellite signals. The filtering block 106 provides a state variable estimation value for correct error of INS navigation information by using measurement data and error covariance inputted from the GPS receiver 104, and calculates and outputs a mode probability for combining navigation information. The inertial navigation calculating block 105 calculates and acquires the INS navigation information based on information measured by the IMU 103, provides it to the filtering block 106, compensates the INS navigation information based on the state variable estimation value inputted from the filtering block 106, compensates the navigation information based on a fusion state variable inputted from the filtering block 106 in response to a result of the compensated navigation, fuses the compensated navigation information based on the mode probability transmitted from the filtering block 106, and provides the fused navigation information to the displaying block 107.

Each element of the integrated navigation apparatus of the present invention will be described in detail.

The 3-axis accelerometer 101 calculates the motion distance by measuring 3 direction accelerations of the moving object, and any kinds of accelerometers may be used. The 3-axis accelerometer 101 is set up inside the IMU 103 in such a manner that the 3 axes are perpendicular to each other.

The 3-axis gyro 102 measures the rotation of the moving object, and any kinds of gyros may be used. The 3-axis gyro 102 has its 3 axes perpendicular to each other, and is set up inside the IMU 103 in such a manner that each axis of the 3-axis gyro 102 becomes the same as the direction of each axis of the 3-axis accelerometer 101.

The IMU 103 transforms output signals of the 3-axis accelerometer 101 and 3-axis gyro 102 into digital signals and transmits the digital signals into the inertial navigation calculating block 105 periodically through a communication way. Herein, the x axis is directed to the front and the y axis is directed to the vertical right of the x axis, while the z axis is directed under the x and y axes perpendicularly to both axes. The IMU 103 is fixed tightly onto the moving object. Herein, the x axis of the IMU 103 is directed to the forward of the moving object, and the y axis of the IMU 103 is directed to the right of the moving object, while the z axis of the IMU 103 is directed under the moving object.

The GPS receiver 104 provides location information, velocity information, location information and pseudo range information in an Earth centered Earth fixed (ECEF) coordination system of a visible satellite by using a GPS satellite. The information provided by the GPS receiver 104 is used in the filtering block 106.

Figure 2:
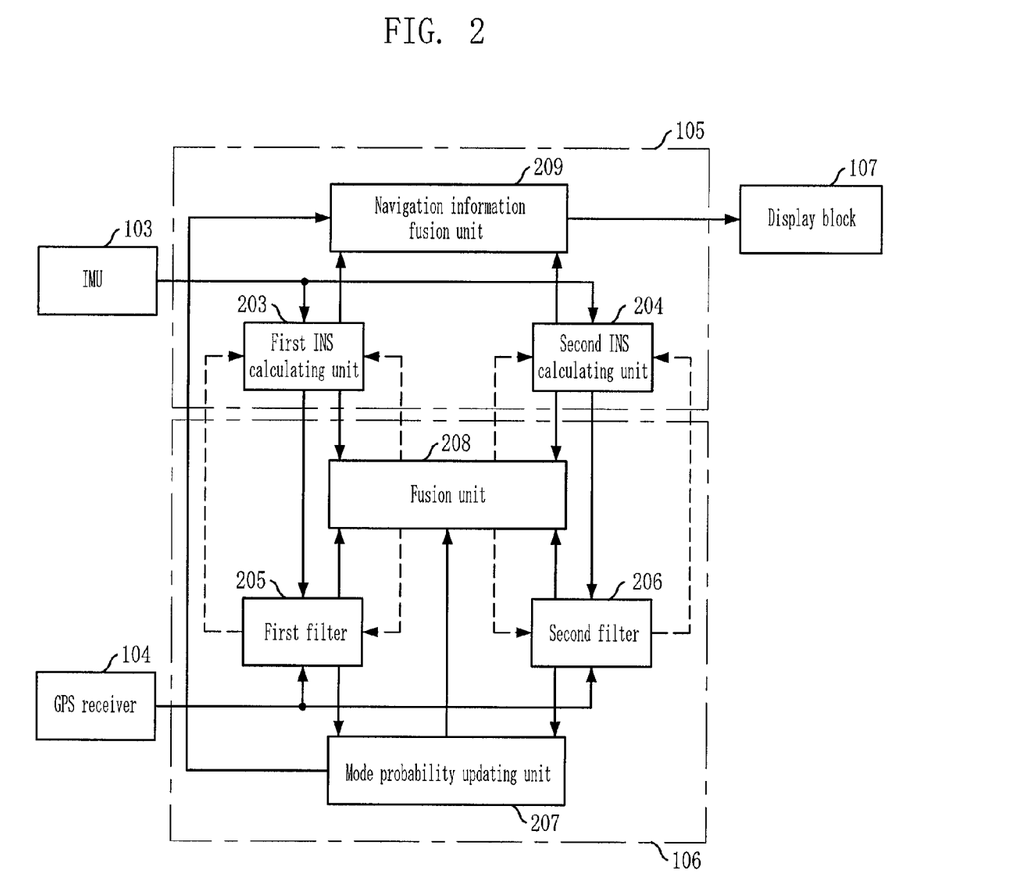
FIG. 2 is a detailed block diagram illustrating an integrated navigation apparatus in accordance with an embodiment of the present invention.

The inertial navigation calculating block 105 and the filtering block 106 estimate an error based on navigation information outputted from the inertial navigation calculating block 105 and information outputted from the GPS receiver 104 and provide error compensated navigation information. Referring to FIG. 2, functions of the inertial navigation calculating block 105 and the filtering block 106 are described in detail.

FIG. 2 is a detailed block diagram of the inertial navigation calculating block 105 and the filtering block 106 in accordance with an embodiment of the present invention.

As shown in FIG. 2, the filtering block 106 includes a first filter 205, a second filter 206, a mode probability updating unit 207 and a fusion unit 208. Also, the inertial navigation calculating block 105 includes a first INS calculating unit 203, a second INS calculating unit 204 and a navigation information fusion unit 209.

The first filter 205 is an infinite impulse response (IIR) filter, and any types of the IIR filters may be used such as an EKF and a SPKF. The second filter 206 is a finite impulse response (FIR) filter, and any types of the FIR filters may be used such as a RHKF filter, a MRHKF filter and a SPRHLF filter.

The first filter 205 and the second filter 206 are executed independently from each other; and the first filter 205 and the second filter 206 are only executed when the measurement data are inputted from the GPS receiver 104.

The first INS calculating unit 203 and the second INS calculating unit 204 individually calculate and acquire INS navigation information based on the information inputted from the IMU 103. The INS navigation information acquired in the first INS calculating unit 203 and the second INS calculating unit 204 is transmitted for estimating error into the first filter 205 and the second filter 206, respectively.

The first filter 205 and the second filter 206 receive the measurement data from the GPS receiver 104 simultaneously. Since functions of the first filter 205 and the second filter 206 are identical, hereinafter, the function of the first filter 205 will be described.

The first filter 205 calculates and acquires the state variable estimation value for compensating the INS navigation information for an error based on the GPS measurement data and the error covariance corresponding to the INS navigation information transmitted from the first INS calculating unit 203 and provides it to the first INS calculating unit 203. Then, a filter fusion is performed. Hereinafter, the filter fusion will be described.

First, the mode probability updating unit 207 is executed at a filter updating period for the filter fusion. The mode probability updating unit 207 initializes a Markov transition matrix, a mode probability and a normalization factor before executing the filters as the following Eq. 1. The initialization of the mode probability updating unit 207 is performed once before executing the filters.

$$M = \begin{bmatrix} m_{11} & m_{12} \\ m_{21} & m_{22} \end{bmatrix}$$

$$\mu = \begin{bmatrix} n_1 \\ n_2 \end{bmatrix}$$

$$\bar{c}_j = \sum_{i=1}^{2} M_{ij}\mu_i$$

Eq. 1

In Eq. 1, M is the Markov transition matrix; $\mu$ is the mode probability; $\bar{c}_j$ is the normalization factor; and $m_{11}+m_{21}=m_{21}+m_{22}=n_1+n_2=1$.

The mode probability updating unit 207 calculates a likelihood ratio based on residuals of the filters and residual covariances transmitted from the first filter 205 and the second filter 206 as the following Eq. 2.

$$\Lambda_{j,k} = \frac{1}{\sqrt{2\pi \|S_{j,k}\|}} \exp\left\{-\frac{1}{2} r_{j,k}^T S_{j,k}^{-1} r_{j,k}\right\}$$

Eq. 2

Here, $r_{j,k}$ represents the residual when k time and j filter; $S_{j,k}$ is the residual covariance; and T denotes a transpose of vector. The residuals of the filters and the residual covariances are calculated as the following Eq. 3.

$$r_{j,k} = z_k - \hat{z}_{j,k}$$

$$S_{j,k} = H_{j,k} P_{j,k}^- H_{j,k}^T + R_j$$

Eq. 3

Here, $z_k$ is the GPS measurement data and $\hat{z}_{j,k}$ is an estimation value included in the navigation information inputted from the INS calculating unit. Moreover, H is a measurement matrix; P is a covariance of a state variable; and R is an error covariance of the measurement data.

In addition, the likelihood ratio may be calculated as the following Eq. 4.

$$\Lambda_{j,k} = \frac{1}{\sqrt{2\pi \|S_{j,k}\|}} \exp\left\{-\frac{1}{2} A_{j,k}\right\}$$

Eq. 4

Here, $A_{j,k}$ is expressed as the following Eq. 5.

$$A_{j,k} = \frac{1}{k} \sum_{i=1}^{k} r_{j,i}^T S_{j,i}^{-1} r_{j,i}$$

Eq. 5

The mode probability updating unit 207 updates the mode probability as the following Eq. 6 based on the likelihood ratio and provides the updated mode probability to the navigation information fusion unit 209.

$$\mu_{j,k} = \frac{1}{c} \Lambda_{j,k} \bar{c}_j$$

Eq. 6

Here, $$c = \sum_{i=1}^{2} \Lambda_{j,k} \bar{c}_i.$$

Also, the mode probability updating unit 207 calculates a fusion probability as the following Eq. 7 based on the updated mode probability and the Markov transition matrix and provides the fusion probability to the fusion unit 208.

$$\mu_{ij,k} = \frac{1}{\sum_{i=1}^{2} M_{ij}\mu_{i,k}} M_{ij}\mu_{i,k} \qquad \text{Eq. 7}$$

When the fusion unit 208 receives the fusion probability inputted from the mode probability updating unit 207, the fusion unit 208 performs fusion with respect to the error covariances of the first filter 205 and the second filter 206 and the error-compensated navigation results acquired in the first INS calculating unit 203 and the second INS calculating unit 204. Hereinafter, the fusion will be described in detail.

When the first INS calculating unit 203 and the second INS calculating unit 204 receive the state variable estimation values from the first filter 205 and the second filter 206, respectively, they compensate the acquired navigation information calculated by using the measurement data outputted from the IMU for an error based on the received state variable estimation values. Also, the first INS calculating unit 203 and the second INS calculating unit 204 transmit the error-compensated navigation results to the fusion unit 208. Moreover, the first filter 205 and the second filter 206 transmit the error covariance which is used for calculating the state variable estimation values of the navigation information to the fusion unit 208.

Then, the fusion unit 208 performs fusion onto the error covariances based on the fusion probability inputted from the mode probability updating unit 207, and a fused error covariance matrix is fed back to the first filter 205 and the second filter 206. Also, the fusion unit 208 performs fusion onto the error-compensated navigation results based on the fusion probability, and a fused state variable is fed back to the first INS calculating unit 203 and the second INS calculating unit 204.

The fusion performed in the fusion unit 208 is expressed as the following Eq. 8.

$$\hat{x}_{j,k}^0 = \sum_{i=1}^{2} \hat{x}_{i,k}\mu_{ij,k} \qquad \text{Eq. 8}$$

$$P_{j,k}^0 = \sum_{i=1}^{2} \{P_{i,k} + [\hat{x}_{i,k} - \hat{x}_{j,k}^0][\hat{x}_{i,k} - \hat{x}_{j,k}^0]^T\}\mu_{ij,k}$$

Here, $\hat{x}_{j,k}$ is the error-compensated navigation results inputted from the INS calculating unit; and $P_{i,k}$ is an error covariance inputted from the filter. Also, $\hat{x}_{j,k}^0$ represents the fused state variable for feedback into the INS calculating unit; and $P_{j,k}^0$ represents the fused error covariance matrix for feedback into the filter.

As shown in Eq. 8, the fused state variable for feedback into the first INS calculating unit 203 and the second INS calculating unit 204 is acquired based on the error-compensated navigation results $\hat{x}_{j,k}$ inputted from the INS calculating unit and the fusion probability $\mu_{ij,k}$. Also, the fused error covariance matrix for feedback into the first filter 205 and the second filter 206 is acquired based on the error covariance $P_{i,k}$ inputted from the filter, the error-compensated navigation results inputted from the INS calculating unit, the fused state variable, and the fusion probability.

When the first filter 205 and the second filter 206 receive the fused error covariance matrix from the fusion unit 208, first filter 205 and the second filter 206 update the error covariance of the filter for calculating the next state variable estimation value. Also, when the first INS calculating unit 203 and the second INS calculating unit 204 receive the fused state variable from the fusion unit 208, the first INS calculating unit 203 and the second INS calculating unit 204 substitute the fused state variable with an INS state variable and transmit it to the navigation information fusion unit 209.

The navigation information fusion unit 209 fuses the navigation information $\hat{x}_{j,k}$ inputted from the first INS calculating unit 203 and the second INS calculating unit 204 based on the mode probability $\mu_{j,k}$ inputted from the mode probability updating unit 207 and outputs a fused navigation information $\hat{x}_k$ to the displaying block 107 at an output timing of the navigation information. A behavior of navigation information fusion unit 209 can be expressed as the following Eq. 9.

$$\hat{x}_k = \sum_{i=1}^{2} \hat{x}_{i,k}\mu_{i,k} \qquad \text{Eq. 9}$$

Figure 3:
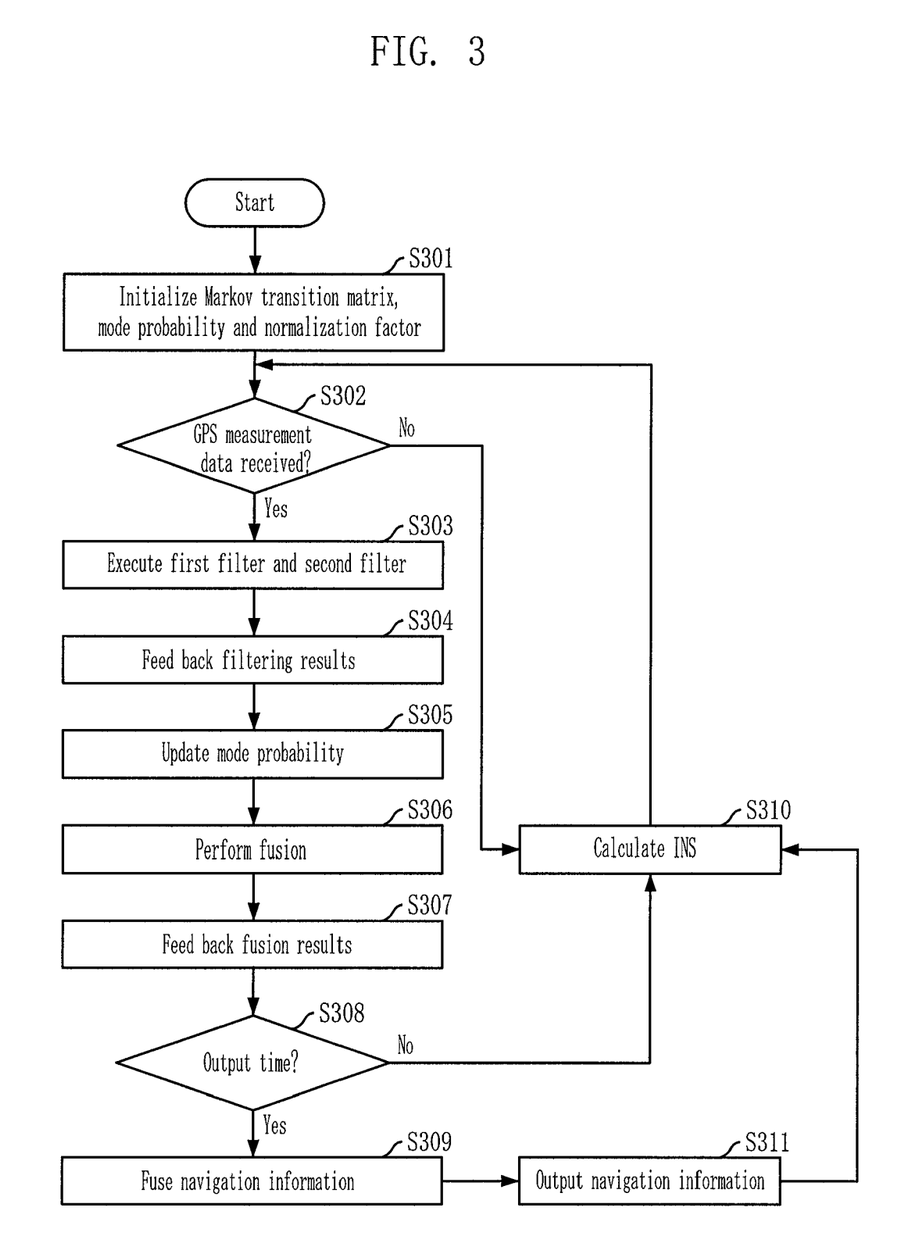
FIG. 3 is a flowchart describing a method for providing navigation information in accordance with an embodiment of the present invention.

FIG. 3 is a flowchart describing a method for providing navigation information in accordance with an embodiment of the present invention.

First of all, the Markov transition matrix, the mode probability and the normalization factor are initialized as Eq. 1 at step S301.

When GPS information is not inputted at step S302, the first INS calculating unit 203 and the second INS calculating unit 204 calculate the navigation information at step S310. When the GPS information is inputted at step S302, the first filter 205 and the second filter 206 are executed at step S303.

Each of the first filter 205 and the second filter 206 calculates and acquires the state variable estimation value to compensate the INS navigation information for an error based on the GPS measurement data and the error covariance with respect to the INS navigation information transmitted from the first INS calculating unit 203 and the second INS calculating unit 204 and provides the state variable estimation value into the first INS calculating unit 203 and the second INS calculating unit 204, respectively, at step S304.

Then, the mode probability is updated and the fusion probability is acquired in the mode probability updating unit 207 at step S305.

In the mode probability updating, the likelihood ratio is acquired based on the residuals of the filters and the residual covariances transmitted from the first filter 205 and the second filter 206, and the mode probability is updated by using the likelihood ratio. Also, the fusion probability is calculated based on the updated mode probability and the initial Markov transition matrix at step S305.

Then, a fusion processing is performed at step S306. The fusion unit 208 performs fusion onto the error covariances based on the fusion probability and performs feedback the fused error covariance matrix into the first filter 205 and the second filter 206, performs fusion onto the error-compensated navigation results based on the fusion probability and performs feedback the fused state variable into the first INS calculating unit 203 and the second INS calculating unit 204 at step S307.

In other words, the fused state variable is acquired based on the error-compensated navigation results inputted from the INS calculating units and the fusion probability and is fed back to the INS calculating units. Also, the fused error covariance matrix is acquired based on the error covariances inputted from the filters, the error-compensated navigation results inputted from the INS calculating units, the fused state variable and the fusion probability, and the fused error covariance matrix is fed back to the filters.

When the first filter 205 and the second filter 206 receive the fused error covariance matrix from the fusion unit 208, the first filter 205 and the second filter 206 update the error covariance of the filter for calculating the next state variable estimation value. Also, when the first INS calculating unit 203 and the second INS calculating unit 204 receive the fused state variable from the fusion unit 208, the first INS calculating unit 203 and the second INS calculating unit 204 use the fused state variable as the INS navigation information.

When the output time of the navigation information comes at step S308, the navigation information fusion unit 209 fuses the navigation information inputted from the first INS calculating unit 203 and the second INS calculating unit 204 and outputs the fused navigation information to the displaying block 107 at steps S309 and S311.

FIGS. 4 to 9 are graphs illustrating simulation results of the integrated navigation apparatus in accordance with an embodiment of the present invention and represent estimation errors of filtering results, i.e., a location error, a velocity error and an azimuth error.

In each figure, a top graph is a result of the EKF; a middle graph is a result of the RHKF filter; and a bottom graph is a result of a multi filter fusion (MMF) performed by fusing two filters.

Figure 4:
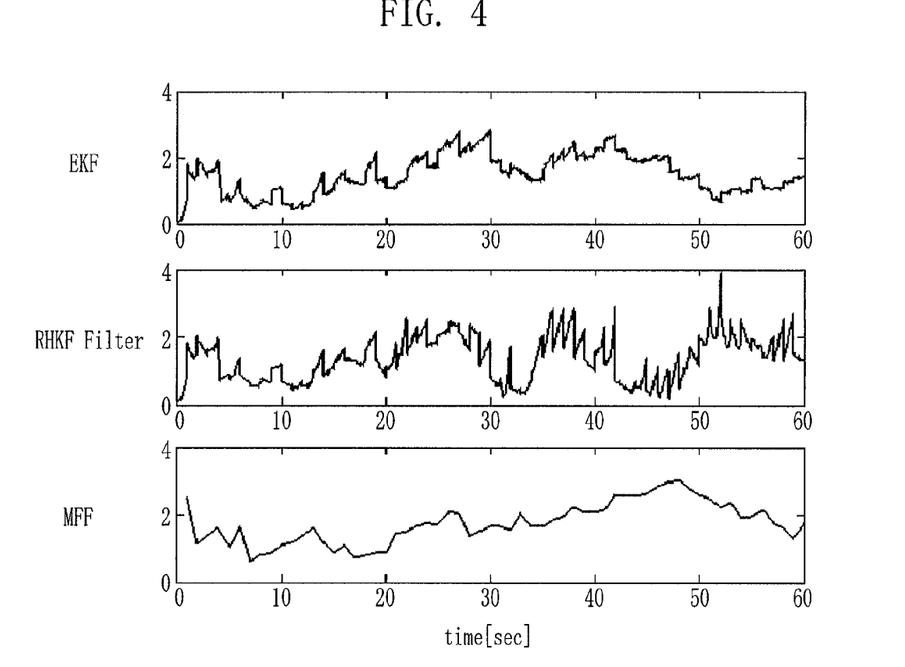
FIGS. 4 to 9 are graphs illustrating simulation results of the integrated navigation apparatus in accordance with an embodiment of the present invention.
Figure 5:
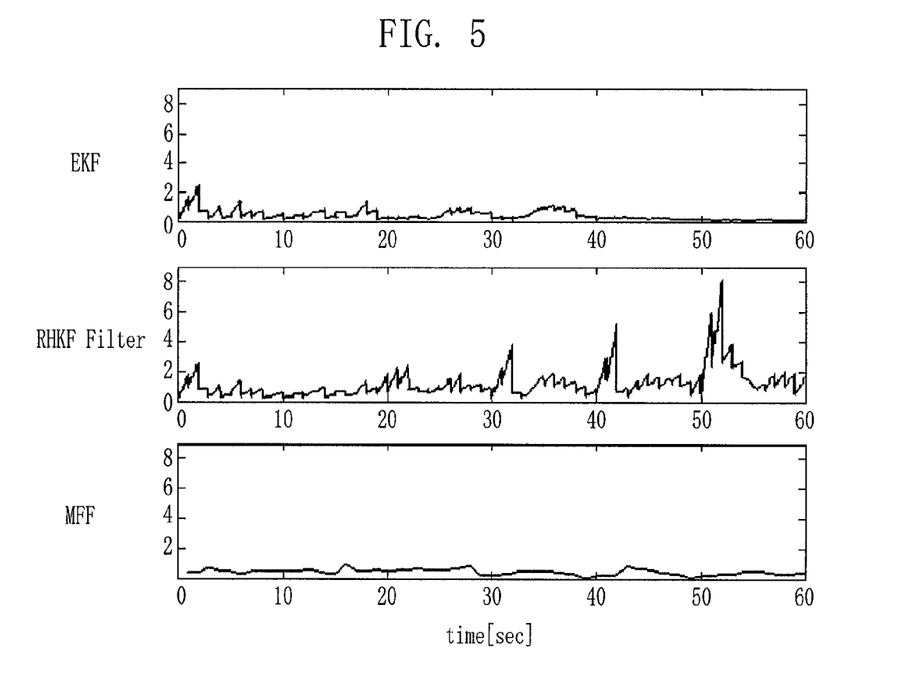
Figure 6:
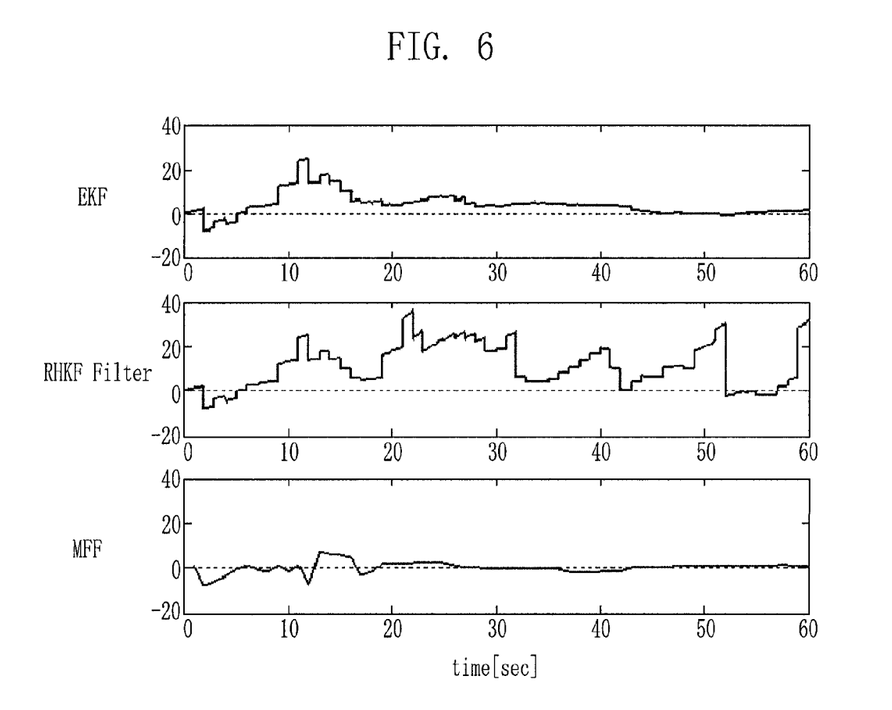

A simulation environment of FIGS. 4 to 6 is as follows.

An accelerometer and a gyro have errors of random constant component and a filter performs modeling a sensor error as a random constant.

When the integrated navigation apparatus of the present invention is executed in the simulation environment of FIGS. 4 to 6, the EKF has better performance than the RHKF filter. When the filter does not have a model uncertainty, the EKF having IIR characteristic has superior performance to the RHKF filter having an FIR characteristic. When two filters, i.e., the EKF and the RHKF filter, are fused, the MMF has superior performance to the two filters, and there is a smoothing effect.

Figure 7:
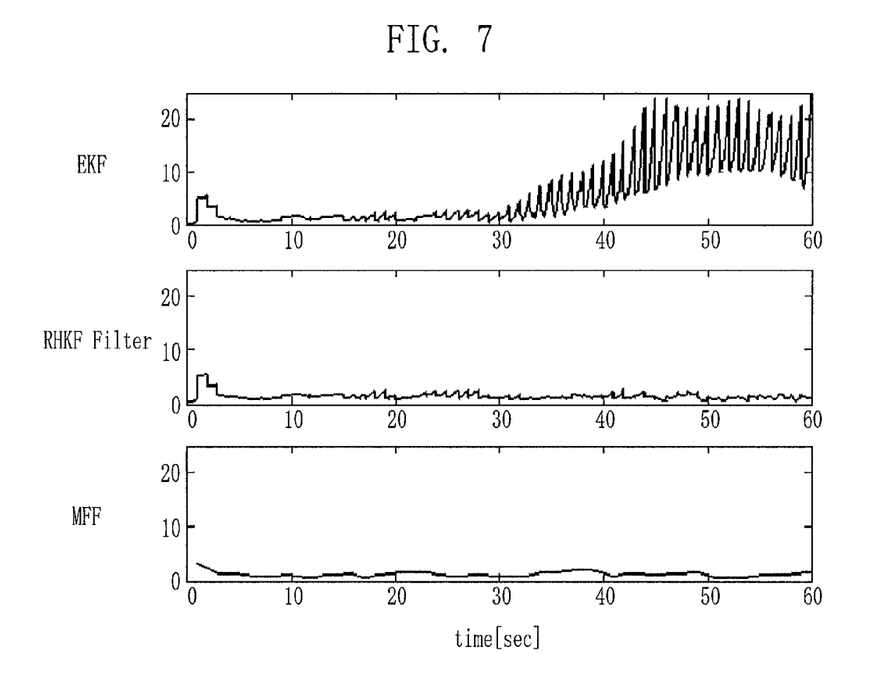
Figure 8:
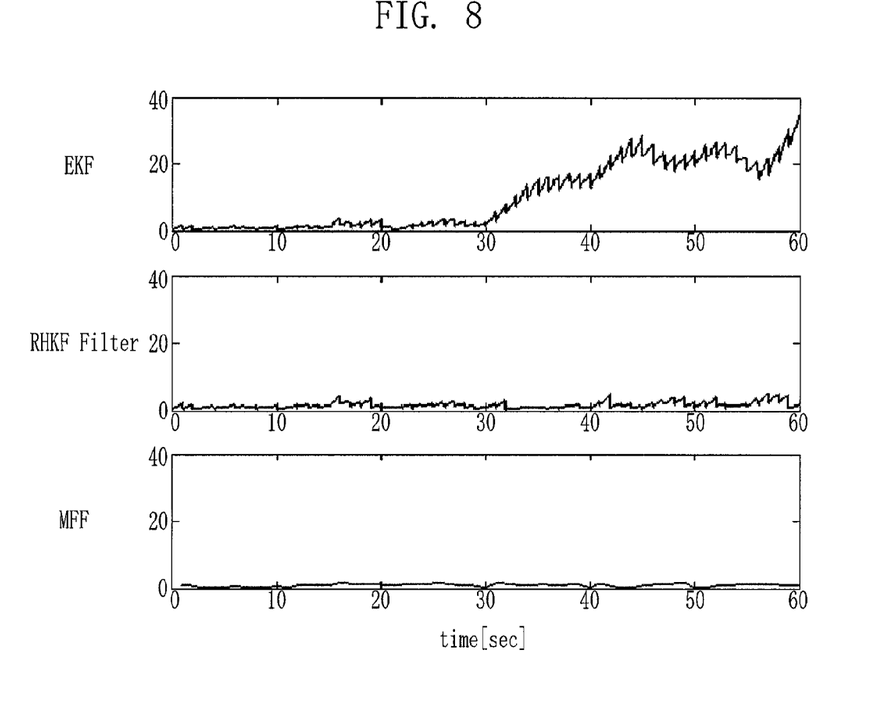
Figure 9:
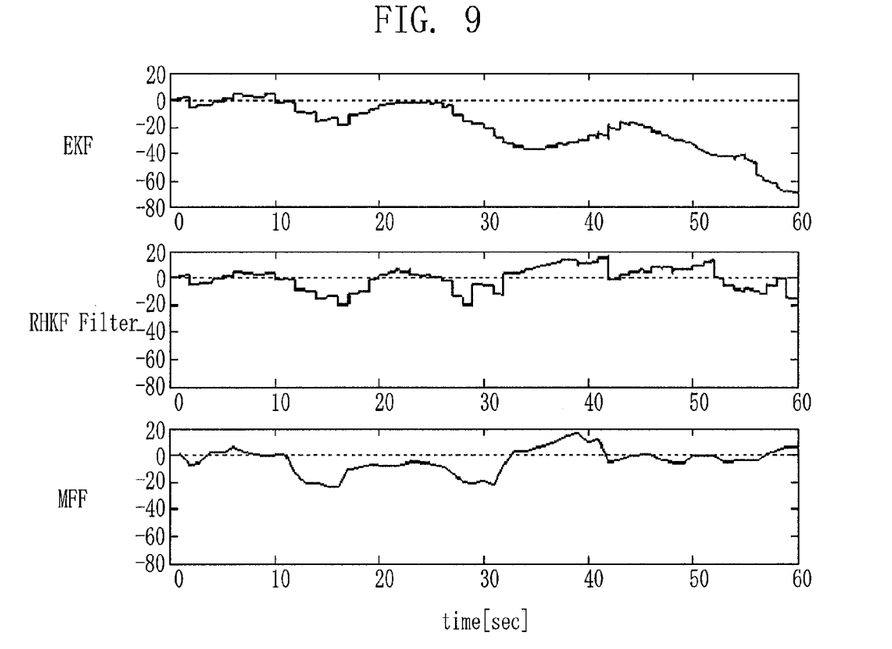

A simulation environment of FIGS. 7 to 9 is as follows.

The accelerometer and the gyro have errors of random walk component and the filter performs modeling a sensor error as a random constant. That is, filter has a model uncertainty.

When the integrated navigation apparatus of the present invention is executed in the simulation environment of FIGS. 7 to 9, in case of the EFK, errors are accumulated and diverged according to time, and in case of the RHKF filter, errors having limited magnitude oscillate. That is, when the model uncertainty exists, the RHKF filter has superior performance to the EKF. When two filters, i.e., the EKF and the RHKF filter, are fused, the MMF has superior performance to the two filters, and there is a smoothing effect.

The scope of the present invention is not limited to the above described embodiments, and the present invention may be used in various filter applications as well as the navigation system for vehicle, aviation and voyage.

The above described method according to the present invention can be embodied as a program and be stored in a computer-readable recording medium. The computer-readable recording medium is any data storage device that can store data which can be read by the computer system. The computer readable recording medium includes a read-only memory (ROM), a random-access memory (RAM), a CD-ROM, a floppy disk, a hard disk and a magneto-optical disk. Since the above procedure can be easily carried out by those skilled in the art to which the invention pertains, detailed description on it will not be provided herein.

While the present invention has been described with respect to certain preferred embodiments, it will be apparent to those skilled in the art that various changes and modifications may be made without departing from the scope of the invention as defined in the following claims.

What is claimed is:

1. An integrated navigation apparatus provided with a GPS receiver receiving GPS satellites signals and an inertial measurement unit (IMU) having a 3-axis accelerometer calculating a motion distance of a moving object and a 3-axis gyro measuring a rotation of the moving object, comprising:

a filtering means for outputting a first state variable estimation value and a second state variable estimation value for error compensation of an INS navigation information based on measurement data inputted from the GPS receiver and error covariances of a first filter and a second filter, calculating and outputting a mode probability for fusing navigation information, performing fusing onto the first filter and the second filter by calculating a fusion probability based on the mode probability and a Markov transition matrix, and outputting fused state variables as fusion results of first navigation information and second navigation information; and an inertial navigation calculating means for calculating first INS navigation information and second INS navigation information based on measurement data of the IMU, transmitting the first INS navigation information and the second INS navigation information to the filtering means, compensating the first INS navigation information and the second INS navigation information based on the first state variable estimation value and the second state variable estimation value inputted from the filtering means, transmitting the compensated first INS navigation information and the compensated second INS navigation information to the filtering means, compensating the first navigation information and the second navigation information based on the fused state variables inputted from the filtering means in response to a compensated results of the first INS navigation information and the second INS navigation information, fusing the compensated first navigation information and the compensated second navigation information based on the mode probability inputted from the filtering means to thereby produce fused navigation information, and providing the fused navigation information to a display unit.

2. The integrated navigation apparatus as recited in claim 1, wherein the first filter is an infinite impulse response (IIR) filter.

3. The integrated navigation apparatus as recited in claim 2, wherein the second filter is a finite impulse response (FIR) filter.

4. An integrated navigation apparatus provided with a GPS receiver receiving GPS satellites signals and an inertial measurement unit (IMU) having a 3-axis accelerometer calculating a motion distance of a moving object and a 3-axis gyro measuring a rotation of the moving object, comprising:

a first filter and a second filter for providing state variable estimation values in order to compensate navigation information for an error based on measurement data inputted from the GPS receiver and an error covariance and outputting a residual of filter and a residual covariance for updating a mode probability;

a mode probability updating means for calculating a likelihood ratio based on the residual of filter and the residual covariance, updating the mode probability based on the acquired likelihood ratio, outputting the updated mode probability, and calculating and acquiring a fusion probability based on the updated mode probability and a Markov transition matrix;

a first navigation information calculating means and a second navigation information calculating means for generating INS navigation information based on information inputted from the IMU, transmitting the INS navigation information to the first filter and the second filter, respectively, compensating the INS navigation information based on the state variable estimation values inputted from the first filter and the second filter, compensating the navigation information based on a fused state variable, and outputting the compensated navigation information;

a fusion means for fusing the compensated navigation information inputted from the first navigation information calculating means and the second navigation information calculating means based on the fusion probability inputted from the mode probability updating means, providing the fused state variable to the first navigation information calculating means and the second navigation information calculating means, fusing the error covariances inputted from the first filter and the second filter based on the fusion probability, and providing the fused error covariance matrix to the first filter and the second filter; and a navigation information fusion means for fusing the navigation information inputted from the first navigation information calculating means and the second navigation information calculating means based on the mode probability inputted from the mode probability updating means and outputting fused navigation information.

5. The integrated navigation apparatus as recited in claim 4, wherein the first filter is an infinite impulse response (IIR) filter.

6. The integrated navigation apparatus as recited in claim 5, wherein the second filter is a finite impulse response (FIR) filter.

7. The integrated navigation apparatus as recited in claim 4, wherein the mode probability updating means initializes the Markov transition matrix, the fusion probability and a normalization factor before executing the first filter and the second filter.

8. The integrated navigation apparatus as recited in claim 4, wherein the mode probability updating means calculates the likelihood ratio based on an Equation expressed as:

$$\Lambda_{j,k} = \frac{1}{\sqrt{2\pi \|S_{j,k}\|}} \exp\left\{-\frac{1}{2} r_{j,k}^T S_{j,k}^{-1} r_{j,k}\right\},$$

where $r_{j,k}$ represents the residual when k time and j filter; $S_{j,k}$ is the residual covariance; T denotes a transpose of vector; the residual of the filter is calculated based on $r_{j,k}=z_k-\hat{z}_{j,k}$; the residual covariance is calculated based on $S_{j,k}=H_{j,k}P_{j,k}H_{j,k}^T+R_j$; $z_k$ is the GPS measurement data; $\hat{z}_{j,k}$ is an estimation value of the navigation information; H is a measurement matrix; P is a covariance of a state variable; and R is an error covariance of the measurement data.

9. The integrated navigation apparatus as recited in claim 4, wherein the mode probability updating means calculates the likelihood ratio based on an Equation expressed as:

$$\Lambda_{j,k} = \frac{1}{\sqrt{2\pi \|S_{j,k}\|}} \exp\left\{-\frac{1}{2} A_{j,k}\right\},$$

Where $$A_{j,k} = \frac{1}{k} \sum_{i=1}^{k} r_{j,i}^T S_{j,i}^{-1} r_{j,i}.$$

10. The integrated navigation apparatus as recited in claim 8, wherein the mode probability updating means updates the mode probability based on an Equation expressed as:

$$\mu_{j,k} = \frac{1}{c} \Lambda_{j,k} \overline{c}_j,$$

where $$c = \sum_{i=1}^{2} \Lambda_{j,k} \overline{c}_i;$$

and $\overline{c}_j$ is the normalization factor.

11. The integrated navigation apparatus as recited in claim 10, wherein the mode probability updating means calculates the fusion probability based on the updated mode probability and the Markov transition matrix ($M_{ij}$) as an Equation expressed as:

$$\mu_{ij,k} = \frac{1}{\sum_{i=1}^{2} M_{ij}\mu_{i,k}} M_{ij}\mu_{i,k}.$$

12. The integrated navigation apparatus as recited in claim 11, wherein the fusion means calculates and acquires the fused state variable $\hat{x}_{j,k}^0$ based on error-compensated navigation results $\hat{x}_{j,k}$ inputted from the first INS calculating means and the second INS calculating means and the fusion probability $\mu_{ij,k}$ as an Equation expressed as:

$$\hat{x}_{j,k}^0 = \sum_{i=1}^{2} \hat{x}_{i,k} \mu_{ij,k},$$

and the fusion means calculates a fused error covariance matrix for feedback to the first filter and the second filter based on the error covariance inputted from the first filter and the second filter, the error-compensated navigation results $\hat{x}_{j,k}$ inputted from the first INS calculating means and the second INS calculating means, the fused state variable $\hat{x}_{j,k}^0$ and the fusion probability $\mu_{ij,k}$ as an Equation expressed as:

$$P_{j,k}^0 = \sum_{i=1}^{2} \left\{P_{i,k} + [\hat{x}_{i,k} - \hat{x}_{j,k}^0][\hat{x}_{i,k} - \hat{x}_{j,k}^0]^T\right\}\mu_{ij,k}.$$

13. A method for providing navigation information in an integrated navigation apparatus having an inertial measurement unit (IMU) and a GPS receiver, comprising the steps of:

a) calculating a first state variable estimation value and a second state variable estimation value for compensating navigation information for an error based on a measurement data inputted from the GPS receiver and an error covariance;

b) calculating a likelihood ratio based on residual of filter and a residual covariance, updating a mode probability based on the acquired likelihood ratio, calculating and acquiring a fusion probability based on the updated mode probability and a Markov transition matrix;

c) compensating a first INS navigation information and a second INS navigation information based on the first state variable estimation value and the second state variable estimation value acquired in step a);

d) fusing the compensated first INS navigation information and the compensated second INS navigation information compensated in step c) based on the fusion probability acquired in step b), acquiring a fused state variable, fusing the error covariance of the filter based on the fusion probability, and outputting a fused error covariance matrix for updating the error covariance of the filter;

e) compensating a first navigation information and a second navigation information based on the fused state variable acquired in step d) and outputting a compensated first navigation information and a compensated second navigation information; and f) fusing the compensated first navigation information and the compensated second navigation information based on the updated mode probability updated in step b).

14. The method as recited in claim 13, further comprising the step of:

a0) initializing the Markov transition matrix, the mode probability and a normalization factor before the step a).

15. The method as recited in claim 14, wherein the first state variable estimation value and the second state variable estimation value are calculated based on an infinite impulse response (IIR) filter and a finite impulse response (FIR) filter, respectively.

16. The method as recited in claim 13, wherein the likelihood ratio of the step b) is calculated based on an Equation expressed as:

$$\Lambda_{j,k} = \frac{1}{\sqrt{2\pi\|S_{j,k}\|}}\exp\left\{-\frac{1}{2}r_{j,k}^T S_{j,k}^{-1} r_{j,k}\right\},$$

where $r_{j,k}$ represents the residual when k time and j filter; $S_{j,k}$ is the residual covariance; T denotes a transpose of vector; the residual of the filter is calculated based on $r_{j,k}=z_k-\hat{z}_{j,k}$; the residual covariance is calculated based on $S_{j,k}=H_{j,k}P_{j,k}^-H_{j,k}^T+R_j$; $z_k$ is the GPS measurement data; $\hat{z}_{j,k}$ is an estimation value of the navigation information; H is a measurement matrix; P is a covariance of a state variable; and R is an error covariance of the measurement data.

17. The method as recited in claim 13, wherein the likelihood ratio of the step b) is calculated based on an Equation expressed as:

$$\Lambda_{j,k} = \frac{1}{\sqrt{2\pi\|S_{j,k}\|}}\exp\left\{-\frac{1}{2}A_{j,k}\right\},$$

where $$A_{j,k} = \frac{1}{k}\sum_{i=1}^{k} r_{j,i}^T S_{j,i}^{-1} r_{j,i}.$$

18. The method as recited in claim 14, wherein the mode probability of the step b) is updated based on an Equation expressed as:

$$\mu_{j,k} = \frac{1}{c}\Lambda_{j,k}\overline{c}_j,$$

where $$c = \sum_{i=1}^{2}\Lambda_{j,k}\overline{c}_i;$$

and $\overline{c}_j$ is the normalization factor.

19. The method as recited in claim 18, wherein the fusion probability of the step b) is calculated and acquired based on the updated mode probability and the Markov transition matrix ($M_{ij}$) as an Equation expressed as:

$$\mu_{ij,k} = \frac{1}{\sum\limits_{i=1}^{2} M_{ij}\mu_{i,k}} M_{ij}\mu_{i,k}.$$

20. The method as recited in claim 19, wherein the fused state variable $\hat{x}_{j,k}^0$ is calculated and acquired based on error-compensated navigation result $\hat{x}_{j,k}$ and the fusion probability $\mu_{ij,k}$ as shown in an equation expressed as:

$$\hat{x}_{j,k}^0 = \sum_{i=1}^{2}\hat{x}_{i,k}\mu_{ij,k},$$

and a fused error covariance matrix is calculated and acquired based on the error covariances inputted from the first filter and the second filter, the error-compensated navigation result $\hat{x}_{j,k}$, the fused state variable $\hat{x}_{j,k}^0$ and the fusion probability $\mu_{ij,k}$ as shown in an equation expressed as:

$$P_{j,k}^0 = \sum_{i=1}^{2}\left\{P_{i,k} + [\hat{x}_{i,k}-\hat{x}_{j,k}^0][\hat{x}_{i,k}-\hat{x}_{j,k}^0]^T\right\}\mu_{ij,k}.$$

* * * * *